INVENTOR.
BRUCE L. WILKINSON

BY HIS ATTORNEYS
HARRIS, KIECH, RUSSELL & KERN

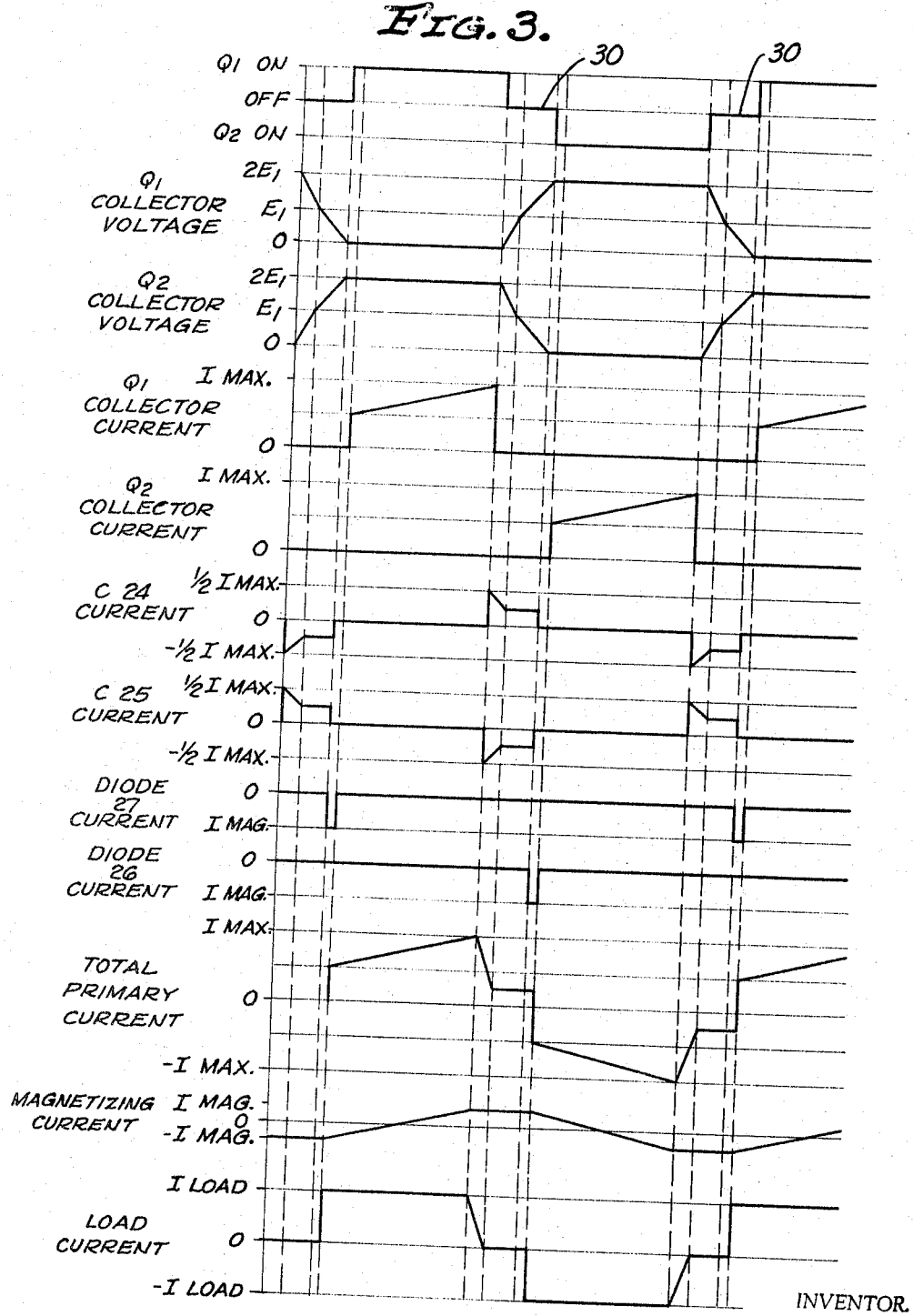

United States Patent Office 3,317,856
Patented May 2, 1967

3,317,856
TRANSISTOR INVERTER CIRCUIT BEING SWITCHED BEFORE OUTPUT TRANSFORMER SATURATES
Bruce L. Wilkinson, Torrance, Calif., assignor to Power Conversion Inc., Long Beach, Calif., a corporation of California
Filed May 20, 1965, Ser. No. 457,385
8 Claims. (Cl. 331—113)

ABSTRACT OF THE DISCLOSURE

A transistor inverter circuit with controlled switching, including a drive circuit for turning the transistors on and off at predetermined times, with a transistor being turned off before the core of the output transformer saturates and with both transistors off during the switching period.

This invention relates to inverter circuits for providing an A.C. output from a D.C. power source and, in particular, to new and improved inverter circuits especially adapted for operation at high frequencies, typically in the range of 20 kilocycles per second to 50 kilocycles per second.

A typical inverter circuit utilizes a pair of transistors connected in series opposition across a primary winding of an output transformer, with the A.C. output appearing at a secondary or load winding of the transformer. The D.C. power source is connected to the junction point of the transistors and to a center tap of the primary winding and a drive circuit provides a drive current to the transistors for turning the transistors off and on. The drive circuit may be energized from a winding on the transformer providing a self-oscillating inverter or the drive circuit may be energized from an external source. The two transistors operate as switches with first one and then the other being closed to connect the D.C. source current through the transformer primary winding alternating in the positive and negative directions to provide the A.C. output. This basic inverter circuit is well known and the present application is directed to novel features which permit higher frequency and higher power operation.

In an inverter circuit, the power handling capability is limited by the losses occurring during the switching operation. It is an object of the present invention to provide a new and improved circuit with controlled switching and one which will have a high efficiency, typically in excess of 90%. A further object is to provide a new and improved circuit which will permit operation of the transistors at substantial increases in current and voltage with a resultant increase in power rating for a given transistor. A particular object is to provide a new and improved switching control which results in an almost ideal switching characteristic with corresponding low switching losses.

It is an object of the invention to provide a new and improved inverter circuit in which the peak power during switching is minimized and in which the danger of second breakdown in the transistors is substantially reduced. A further object is to provide an inverter circuit wherein the transistors are not simultaneously exposed to voltage and current in the collector-emitter circuit.

It is an object of the invention to provide an inverter circuit having a pair of transistors connected in series opposition across a primary winding of the output transformer, with a secondary winding for the load and with the D.C. supply connected to the junction point of the transistors and to the center tap of the primary winding and including a drive circuit connected to the transistors in driving relation for sequentially turning the transistors on and off in synchronism and out of phase with each other, with the drive circuit producing a drive current substantially in the form of a square wave with a zero current period between each positive and negative portion of the wave, and capacitor means connected across the primary winding of the transformer. A further object is to provide such a circuit incorporating a pair of diodes, with a diode connected across the emitter and collector of each of the transistors for limiting the reverse voltage to a very low value, typically less than one volt. An additional object is to provide such a circuit including means connected in the load side of the transformer for delaying the application of the load current to the secondary winding for a relatively small portion of each half cycle of operation.

The invention also comprises novel combinations and arrangements of parts which will more fully appear in the course of the following description. The drawings merely show and the description merely describes preferred embodiments of the present invention which are given by way of illustration or example.

In the drawings:

FIG. 3 is a timing diagram illustrating the operation of the inverter circuit of the invention.

Figure 1:
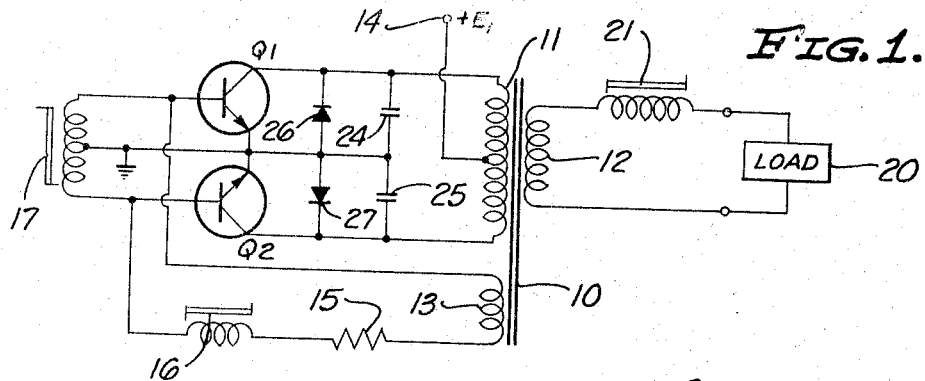
FIG. 1 is an electrical schematic of a preferred form of a self-oscillating inverter incorporating the present invention.

The inverter circuit of FIG. 1 includes transistors Q1 and Q2 and transformer 10 with a primary winding 11, a secondary winding 12 and a drive winding 13. The transistor emitters are connected together and the transistor collectors are connected to the terminals of the primary winding 11, respectively. The D.C. power source is connected between circuit ground and terminal 14 which, in turn, is connected to the center point of the primary winding 11.

The drive circuit includes the drive winding 13 which is connected across the transistor bases through a current limiting resistor 15 and a saturable reactor 16. The drive circuit also includes another saturable reactor 17 which is connected across the transistor bases, with the center tap thereof connected to circuit ground.

The output winding 12 is connected to a load 20 via a delay device which typically may be a saturable reactor 21. Other suitable delay devices will be described hereinbelow.

Capacitors 24, 25 are connected in series across the primary winding 11, with the junction point of the capacitors connected to the junction point of the transistors Q1, Q2. A single capacitor may be used in place of the two capacitors in series if desired, but the illustrated version is preferred in that the two capacitors function to reduce voltage spikes occurring from undesired or parasitic inductances existing in the leads, windings and so forth. A diode 26 is connected across the emitter-collector circuit of the transistor Q1 and a similar diode 27 is connected across the emitter-collector circuit of the transistor Q2.

The drive circuit serves to turn the transistors off and on, i.e., to switch the transistors between the conducting and nonconducting states. The output of the drive circuit for the inverter of the present invention is shown as the top wave form of FIG. 3, with transistor Q1 being turned on during the positive portions of the wave and transistor Q2 being turned on during the negative portions of the wave. The drive circuit provides for an off period indicated at 30 between each transistor on period, during which the switching occurs. The duration of the off period will be a function of the switching time of the transistors. Typically, this off period, sometimes referred to as a notch or gap in the drive, will be in the order of three to five microseconds. Such a drive current may be produced by the inverter itself as in the self-oscillating embodiment of FIG. 1. The drive current may also be produced externally, as by the circuit of FIG. 2 which will be explained hereinbelow.

The operation of the inverter circuit is as follows. Start by considering transistor Q1 on or conducting. The collector of the transistor Q1 will be essentially at circuit ground and the collector of the transistor Q2 will be at $+2E_1$. The saturable reactor 16 is saturated and presents a low impedance to the flow of drive current from the winding 13. The saturable reactor 17 is in the blocking state and therefore shunts very little of the drive current. When the saturable reactor 17 saturates, a low impedance results from the base of the transistor Q1 to circuit ground which quickly shuts off the transistor Q1. In the conventional circuit, the collector-emitter voltage of the transistor Q1 would rise very rapidly to $2E_1$. However, with the capacitors 24, 25 in the collector circuit, the voltage across the transistor rises relatively slowly, allowing the collector current to decay to zero before any appreciable collector voltage exists. This operation limits the power during turnoff to a very low value.

The collector-emitter voltage across the transistor Q1 now rises to $2E_1$ and the collector-emitter voltage across the transistor Q2 falls to zero, at which time the diode 27 conducts preventing any further voltage change.

The collector current in the transistor Q2 is maintained at zero until the collector voltage reaches zero. This control is produced by the saturable reactor 16 which functions to block the drive current for a short period of time and then saturates, enabling the transistor Q2 to turn on after the collector voltage has reached zero, thereby limiting the power during the turn-on portion of the cycle.

The transistor Q2 remains on until the reactor 17 saturates again, at which time the process described above repeats, turning the transistor Q2 off and the transistor Q1 on. The time required for saturation of the reactor 17 controls the duration of the on period for each transistor and the time required for saturation of the reactor 16 controls the duration of the period 30.

In the operation of this inverter, the voltage across the primary of the transformer is inverted while both the transistors are in the "off" condition (no drive). The load current alone is sufficient to collapse the voltage across the primary; however, an inductive current is required to cause the voltage to build up in the opposite polarity. This current is supplied by the magnetizing current of the transformer. The magnetizing current of a transformer is typically somewhat less than the load current. As a result, the load would overcome the effect of the magnetizing current preventing the voltage from inverting. This difficulty is resolved by use of the delay provided by the saturable reactor 21. This reactor delays the start of the load current until inversion has been completed and the appropriate transistor is driven on. The diode across each transistor conducts the magnetizing current until the load is applied, and the net current thereafter if the load is less than the magnetizing current. After the inversion of the transformer primary and prior to application of load this magnetizing current is flowing the opposite direction from what would be normal load current. The transistors are not capable of passing this current and the diodes carry the reverse current becomes sufficient to overcome this reverse current.

Figure 4:
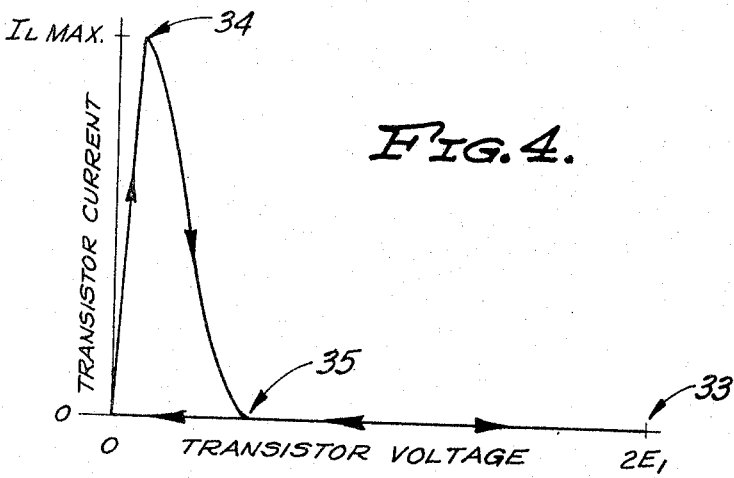
FIG. 4 is a graph illustrating the voltage-current characteristic of the transistor of the inverter circuit of FIG. 1.

The current-voltage characteristic of a transistor during the switching operation is shown in the load line curve of FIG. 4. With the transistor off, the current through the transistor is zero and the collector-emitter voltage is $2E_1$, as indicated at point 33. During the switching operation, the voltage drops to zero while the current remains at zero. The transistor current does not begin to rise until the transistor voltage has gone to zero, after which the current rises very rapidly to the maximum value, as indicated at point 34. At this time, the voltage across the transistor is very small, ordinarily less than 1 volt. This completes the turn on portion of the switching operation. In the turn off portion of the switching cycle, the current drops very rapidly to zero, while the voltage rise across the transistor is delayed so that the current reaches zero at a relatively low voltage as indicated at point 35. The voltage then continues to rise to the value at point 33. In a typical circuit, the maximum voltage $2E_1$, may be about 60 volts with the maximum current $I_L$ being about 30 amperes. The voltage at which the current falls to zero, point 35, will be about 15 volts.

The inverter circuit with the switching control provides a minimum switching loss and permits operation of the inverter at high frequencies such as in the range of 20 kilocycles per second to 50 kilocycles per second. In one specific circuit, the inverter produces 1500 watts at 20 kilocycles per second with an efficiency of 91%.

The circuit of the invention also permits operation of the transistors at higher ratings, since the switching losses and hence heating are substantially reduced. The circuit permits operation of transistors at double the conventional current and at double the conventional voltage, providing up to a four-times increase in power rating.

The circuit limits the peak power pulses normally occurring during switching and thereby improves the life and reliability of the components. The circuit also reduces the radio frequency interference generated by such pulses during the switching operation.

Inverter circuits often use two or more transistors in parallel for higher current ratings with resultant problems in current sharing, particularly during the turnoff operation when one transistor may shut off sooner than another placing the entire load on a single transistor. The present circuit substantially eliminates such problems by provision of the capacitors across the primary winding which handle the current load during the turn off operation, permitting very fast turnoff of current in the transistors themselves.

Figure 2:
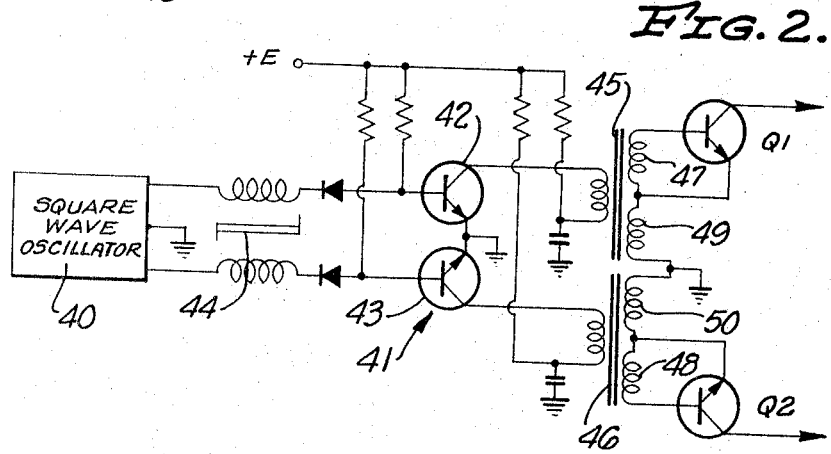
FIG. 2 is an electrical schematic of an external drive circuit for use with the inverter of the invention.

As indicated above, the drive circuit may be self-energized or may be an external separate circuit. A typical external drive circuit is shown in FIG. 2 and could be substituted for the drive winding 13 and the reactors 16, 17. The transistors Q1 and Q2 correspond to the transistors Q1 and Q2 of FIG. 1, the remainder of the circuit of FIG. 1 being the same.

The drive circuit includes a square wave oscillator 40 providing an input to an amplifier stage 41 comprising transistors 42, 43. A saturable reactor 44 is provided between the oscillator and the amplifier stage to produce the notch or zero drive current period 30. The output from the amplifier stage 41 is coupled to the transistor Q1 via transformer 45 and to the transistor Q2 via transformer 46. Secondary winding 47 on the transformer 45 provides the drive for the transistor Q1. Secondary winding 49 is a positive current feedback winding utilized for the purpose of minimizing the power required from the transistors of the drive amplifier stage 41. Secondary windings 48 and 50 of the transformer 45 operate in the same manner with the transistor Q2.

Referring to the delay means in the load or secondary side of the transformer 10, this delay in application of load current can be obtained by various conventional means. A saturable reactor as indicated at 21 is a preferred device for producing the delay. Alternatively, a simple inductive load could be utilized. In another form, the load could comprise one or more silicon controlled rectifiers with the turn on time of the rectifier being delayed at least the desired time.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an inverter circuit having a pair of transistors connected in series opposition across a primary winding of the output transformer, with a secondary winding for the load and with the D.C. supply connected to the junction point of the transistors and to the center tap of the primary windings, the improvement comprising in combination:
   a drive circuit connected to said transistors in driving relation for sequentially turning said transistors on and off in synchronism and out of phase with each other,
   said drive circuit producing a drive current substantially in the form of a square wave with a zero current period between each positive and negative portion of the wave, with the drive current turning a transistor off prior to saturation of the core of the output transformer;
   capacitor means connected across said primary winding of the transformer; and
   means connected in the load side of said transformer for delaying the application of load to the secondary winding until the secondary voltage rises to substantially peak value following polarity reversal.

2. In an inverter circuit having a pair of transistors connected in series opposition across a primary winding of the output transformer, with a secondary winding for the load and with the D.C. supply connected to the junction point of the transistors and to the center tap of the primary winding, the improvement comprising in combination:
   a drive circuit connected to said transistors in driving relation for sequentially turning said transistors on and off in synchronism and out of phase with each other,
   said drive circuit producing a drive current substantially in the form of a square wave with a zero current period between each positive and negative portion of the wave, with the drive current turning a transistor off prior to saturation of the core of the output transformer;
   capacitor means connected across said primary winding of the transformer;
   a pair of diodes, with a diode connected across the emitter and collector of each of said transistors and of a polarity to limit the reverse voltage thereacross; and;
   means connected in the load side of said transformer for delaying the application of load to the secondary winding until the secondary voltage rises to substantially peak value following polarity reversal.

3. An inverter circuit as defined in claim 2 in which said capacitor means comprises a capacitor connected across said primary winding.

4. An inverter circuit as defined in claim 2 in which said capacitor means comprises two capacitors connected in series across said primary winding with the junction point of said capacitors connected to said junction point of said transistors.

5. An inverter circuit as defined in claim 2 in which said drive circuit is energized from said transformer providing a self-oscillating inverter, with said drive circuit including an additional transformers widing in series with a first saturable reactor and connected across the transistor bases, and a second saturable reactor connected across said transistor bases with a center tap thereof connected to said junction point of said transistors.

6. An inverter circuit as defined in claim 2 in which said drive circuit is energized from an additional winding of said transformer providing a self-oscillating inverter.

7. An inverter circuit is defined in claim 2 in which said drive circuit is energized externally of said inverter circuit.

8. An inverter circuit as defined in claim 2 in which said means connected in the load side includes a reactor connected in series with said secondary winding.

References Cited by the Examiner

UNITED STATES PATENTS

| | | | |
|---|---|---|---|
| 2,937,298 | 5/1960 | Putkovich et al. | 331—113 |
| 2,987,665 | 6/1961 | Thompson | 331—113 |
| 2,990,519 | 6/1961 | Wagner | 331—113 |
| 3,256,495 | 6/1966 | Hunter | 331—113 |

ROY LAKE, *Primary Examiner.*

S. H. GRIMM, *Assistant Examiner.*

UNITED STATES PATENT OFFICE
CERTIFICATE OF CORRECTION

Patent No. 3,317,856　　　　　　　　　　　　　　　　May 2, 1967

Bruce L. Wilkinson

It is hereby certified that error appears in the above numbered patent requiring correction and that the said Letters Patent should read as corrected below.

Column 3, line 73, after "current" insert -- until the load current --; column 5, line 16, for "windings" read -- winding --; column 6, line 8, for "and;" read -- and --; line 24, for "transformers winding" read -- transformer winding --.

Signed and sealed this 21st day of November 1967.

(SEAL)
Attest:

Edward M. Fletcher, Jr.
Attesting Officer

EDWARD J. BRENNER
Commissioner of Patents